US009689667B2

(12) United States Patent
Royo Royo et al.

(10) Patent No.: US 9,689,667 B2
(45) Date of Patent: Jun. 27, 2017

(54) SYSTEM, METHOD AND COMPUTER PROGRAM FOR RECEIVING A LIGHT BEAM

(75) Inventors: Santiago Royo Royo, Barcelona (ES); Jordi Riu Gras, Barcelona (ES)

(73) Assignee: UNIVERSITAT POLITECNICA DE CATALUNYA, Barcelona (ES)

( * ) Notice: Subject to any disclaimer, the term of this patent is extended or adjusted under 35 U.S.C. 154(b) by 0 days.

(21) Appl. No.: 14/005,606

(22) PCT Filed: Mar. 15, 2012

(86) PCT No.: PCT/IB2012/000501
§ 371 (c)(1),
(2), (4) Date: Oct. 30, 2013

(87) PCT Pub. No.: WO2012/123809
PCT Pub. Date: Sep. 20, 2012

(65) Prior Publication Data
US 2014/0049783 A1    Feb. 20, 2014

(30) Foreign Application Priority Data
Mar. 17, 2011 (EP) .................................... 11002231

(51) Int. Cl.
G01B 11/24   (2006.01)
G01B 11/22   (2006.01)
G01S 7/481   (2006.01)
G01S 7/486   (2006.01)
G01S 17/89   (2006.01)

(52) U.S. Cl.
CPC .............. *G01B 11/22* (2013.01); *G01S 7/486* (2013.01); *G01S 7/4816* (2013.01); *G01S 7/4817* (2013.01); *G01S 17/89* (2013.01)

(58) Field of Classification Search
CPC . G01B 9/02; G01B 11/22; G08B 5/04; G01C 21/00
See application file for complete search history.

(56) References Cited

U.S. PATENT DOCUMENTS

| 2005/0128369 | A1  | 6/2005 | Perry |
| 2007/0216769 | A1  | 9/2007 | Zganec |
| 2008/0147253 | A1* | 6/2008 | Breed ............................. 701/3 |
| 2010/0149493 | A1* | 6/2010 | Penn .................. H04N 5/23293 353/20 |
| 2011/0211077 | A1* | 9/2011 | Nayar .................... G02B 26/06 348/207.1 |
| 2012/0050750 | A1* | 3/2012 | Hays ............................. 356/519 |

FOREIGN PATENT DOCUMENTS

WO    WO2012/123809 A1    9/2012

* cited by examiner

*Primary Examiner* — Tarifur Chowdhury
*Assistant Examiner* — Jamil Ahmed
(74) *Attorney, Agent, or Firm* — Brinks Gilson & Lione

(57) ABSTRACT

The invention relates to a system (21) for receiving a light beam, comprising an array of light sensors (26). The system also comprises a pixelated light switch array (24), in which each switch is adapted to receive at least one portion of the light beam and direct it to the array of light sensors (26), and the pixelated light switch array (24) comprises a higher number of switches than the number of light sensors comprised in the array of light sensors (26).

18 Claims, 3 Drawing Sheets

SYSTEM, METHOD AND COMPUTER PROGRAM FOR RECEIVING A LIGHT BEAM

The present invention relates to a method for receiving a light beam. More specifically, the invention relates to a method for receiving a light beam that, for example, may be a part of a method for scanning a surface, the received light beam being a light beam reflected in the surface to be scanned.

The invention also relates to a system and a computer program for receiving a light beam, suitable for carrying out such a method.

BACKGROUND ART

Nowadays, there is a wide range of fields in which 3D mapping and information is applied to enhance different technologies: being video generation techniques including depth information, guiding of vehicles through mapping of the surface where the vehicle stands, object location, quality control in a manufacturing process, etc.

One of such 3D mapping used in said fields is the scanning of surfaces by means of systems based on Time of Flight measuring techniques (known as TOF), which have been widely used in the past for obtaining images with depth information.

Said systems based on TOF techniques commonly involve the implementation of a system for transmitting and receiving a light beam, in order to measure distances from a surface. The first imaging systems based on TOF used mechanical scanning techniques and comprised a mechanical system responsible for managing the transmission and reception of the light beam in a determined direction. In any case, the measure was based on a single point with a single sensor and the image was formed from a mechanical scanning and the correlation of "measurement" and "trigger point" of the light beam.

Furthermore, the mechanical scanning involved problems relating to the vibration of the components of the system, their lower durability and big size.

As opposed to the systems for receiving a light beam used in the described mechanical systems, there also exist systems for receiving a light beam based on arrays of light sensors.

Basically, there are scanning systems that comprise an array of light sensors of a specific size (n columns by m rows), which may receive and detect the reflection of the light beam on the surface all at once. These systems, known as Flash Ladars, use modulated and/or pulsed TOF measuring techniques, which are widely known. Furthermore, by using these systems to obtain a digital image, there is no need to perform a mechanical scanning of a surface in two dimensions, since the array itself defines a two-dimensional surface, which in the end will define the image size.

More specifically, as can be seen in FIG. 1, a system for scanning a surface usually used nowadays (in this example, a system using pulsed TOF techniques, although modulated ones are also used) comprises a laser or LED beam transmitter 1 that transmits a light beam 2 to the surface 3 to be scanned, this light beam being reflected on the surface and being received by the array of light sensors 4 acting as a receiving system and acting as a detector for determining the moment of receiving each portion of the light beam 2. Further, the system comprises a beam splitter 5 which directs a portion of the light beam to a detector 9 for determining the moment of starting the transmission of the light beam, the required optical elements 6,7, and a device 8 for counting the TOF values (taking into account the moment in which the detector 9 detects the portion of the light beam split by the beam splitter 5) for each portion of the light beam received by the array of light sensors 4 and for determining the distance between the transmitter 1 and the surface 3 taking into account the corresponding TOF value. This way, the system enables to obtain a 3D digital image of the scanned surface.

An example of a system using a pulsed TOF technique device developed by MIT is described in *"Real-Time 3D Ladar Imaging"* (Cho, Anderson, et. al., LINCOLN LABORATORY JOURNAL, volume 16, no. 1, 2006). Such a TOF device comprises an array of light sensors, and it uses pulsed signals. More specifically, a 32×32 pixel sensor is used, which is able to perform measurements at a frequency of up to 16 KHz, using a signal with a wavelength of 532 nm and a pulse width of 250 ps.

Other few examples of manufacturers or development teams which have worked with this technology in the past and/or are still developing it, but in the field of the modulated techniques are Mesa Imaging (a Centre Suisse d'Electronique et de Microtechnique (CSEM) spin-off), which have designed and commercialized a TOF imaging camera; PMD Technologies (a Zentrum für Sensorsysteme (ZESS) spin-off) from the Siegen University in Germany, which, similarly to CSEM, have developed an array-based TOF imaging camera; Optrima (an ETRO (Department of Electronics and Informatics) and VUB (Vrije Universiteit Brussel) spin-off), which have also developed a further TOF array-based imaging camera; and Canesta Inc., a company which, since 2004, has developed sensing devices used in TOF imaging cameras such as the previously described.

However, these imaging systems have limitations related to their receiving system, where the size of the light sensors comprised in the array of light sensors affects the resolution of the image of the scanned surface. Basically, given that the overall size of the light sensors (since it is difficult to integrate a sensor and its circuitry in one silicon chip using normal microelectronic schemes) is large, the number of portions of the light beam detectable by the scanning system is low (i.e. fewer portions can be distinguished), and therefore the spatial resolution of the scanned image is low. Since said spatial resolution of the digital image may be crucial when using the device in fields such as video generation techniques involving depth information in video images, guidance of vehicles or robots by means of 3D vision, quality control in manufacturing processes, etc. . . . , the existing systems, with lower spatial resolutions, may not be suitable to be used in said applications, if a high spatial resolution or performance of an existing device is required.

In summary, the known receiving systems have the drawback that the number of portions of the light beam received by the array of light sensors is too small, that is, from a given light beam and due to the size of the elements in the array, the amount of portions of the light beam that the systems can receive is too small (given that only one portion of the light beam is received by each light sensor), so spatial resolution of the scanned image is low. This way, the use of these receiving systems is limited to certain applications and even for these applications the results are not as good as one would wish.

SUMMARY OF THE INVENTION

It is an object of the present invention to provide a system for receiving a light beam that receives a higher number of portions of the light beam than the known receiving systems previously described.

To achieve the above, according to a first aspect, the invention provides a system for receiving a light beam comprising a pixelated light switch array, in which each switch is adapted to receive at least one portion of the light beam and direct it to the array of light sensors, and in that the pixelated light switch array comprises a higher number of switches than the number of light sensors comprised in the array of light sensors.

The provision of the pixelated light switch array with a higher number of switches than the number of light sensors comprised in the array of light sensors allows receiving a higher number of portions of the light beam. However, at the same time, when combining the pixelated light switch with a system for receiving a light beam, the reception of said light beam becomes very delicate since the usual size of a pixel an array may normally be approximately 10 um (depending on the type of array), which means that the received light by a single pixel is very low, and the device will have to use sensors with a proper sensitivity, to be able to detect a light beam with a size corresponding to the size of the pixel.

An alternative or addition to the system would be to, when in use, assure that the system for receiving a light beam is used in combination with a more powerful light source than the ones used in the prior art.

It is important to highlight that the array of light sensors may be understood as an array of any size, including an array with a single light sensor, that is, an array of 1×1 light sensor.

According to another aspect of the invention, it is provided a method for receiving a light beam, the method comprising, for each switch of a pixelated light switch array:
  receiving at least one portion of the light beam;
  directing (for example, deflecting the received portion) the received portion of the light beam to an array of light sensors;
the pixelated light switch array comprising a higher number of switches than the number of light sensors comprised in the array of light sensors.

By performing said method and using said system for receiving a light beam, a higher number of portions of reflected light beam can be received according to a reflected surface, in comparison with previous systems which used an array of light sensors with no pixelated light switch array. More specifically, when a light beam is transmitted and reflected to a surface, a higher number of reflected portions of the light beam can be received, thus obtaining more information about the reflected surface which may be used in several applications, such as the obtaining of an image corresponding to the shape, speed, type of movement, or other characteristics of said surface.

Also, according to another aspect, the invention provides a computer program product comprising program instructions for causing a computer system to perform the method for receiving a light beam described before.

Said computer program may be embodied on storing means (for example, on a record medium, on a computer memory or on a read-only memory) or carried on a carrier signal to be, for example, downloaded from a computer or sent by an email (for example, on an electrical or optical carrier signal).

According to a preferred embodiment of the invention, the invention provides a system for scanning a surface comprising:
  a light source for transmitting a light beam to the surface to be scanned;
  the system for receiving a light beam as described before, for receiving the light beam reflected on the surface;
  a first computer system for determining the time of flight value of each received portion of the light beam;
  a second computer system for determining a parameter related to the distance travelled by each received portion of the light beam taking into account its time of flight value determined by the first computer system;
wherein the determined parameter related to the distance of each portion of the light beam is indicative of a spatial point of the scanned surface.

By using this scanning system, a digital image may be obtained which comprises a bidimensional set of information, defined by the number of switches of the pixelated light switch array, and a third dimension which is the corresponding parameter related to the distance determined for each value of the bidimensional set of points defined by the pixelated light switch array. Said parameter related to the distance may be a parameter used to obtain said distance, a parameter calculated out of distance, or the distance value itself.

Said digital image may have, consequently, a higher number of points (a higher spatial resolution) than a digital image obtained by methods and systems of the prior art, therefore making it useful for applications which demand a higher level of precision, such as quality control in a manufacturing process, movement guided by 3D vision, etc.

On the other hand, the first computer system and the second computer system may be part of a single computer system. Further, the scanning system may comprise a third computer system for controlling the pixelated light switch array. This third computer system may also be part of the single computer system that may include the first and/or second computer systems.

Also, the determination of the time of flight value of each received portion of the light beam may be performed by using TOF calculations. One such calculation typically used involves using the formula:

$$d=(c/2f)*(\text{phase}/2*pi)$$

c=speed of light;
f=modulation frequency of the light (a typical case is a value of 20 MHz);
phase=phase of the received signal.

The above formula is a general one which may be modified depending on the modulation techniques used for the calculation. For example, if a pulsed technique is used, the formula is:

$$d=c*t;$$

when the time of displacement of a light pulse is counted and "c" is the speed of light.

The light sensors comprised in the array of light sensors may be any one of the following list: photodiode sensors, APDs (Avalanche photodiodes) type sensors, SPADs (Single photon avalanche photodiodes) type sensors, SiPM (Silicon photomultipliers) type sensors or MPPC (Multipixel photon counter), and PMT (photomultiplier tube) type sensors, or any other type of suitable or similar light detecting device.

Also, for an optimum performance of the overall system, it may have to be assured that the sensors are properly isolated from external lights, since the light beams redirected by the pixelated light switch array have very low power and their detection can easily distorted by a normal ambient light. Furthermore, the sensors would have to be implemented in such a way that its signal-noise ratio is optimized, taking into account their low power.

Furthermore, for a proper performance of the system and avoiding measurements distorted by other signals, the computer systems and the overall system may have to be able to process signals with a wide bandwith, thus minimizing the effect from the parasite capacities, to be able to avoid them and any other jitter effect.

An example of such an effect would be that a typical signal to be detected by the light sensors would be signals with delays in the order of 30 ps, thus making it important to use electronics which do not distort such a precise signal.

According to a preferred embodiment, the light source is adapted to generate a pulsed light beam for pulsed TOF calculation techniques. More specifically, by using a pulsed light beam, the time when the pulsed light beam is transmitted, and the moment of starting the transmission of the light beam, used for determining the time of flight values, may be set using any feature related to the shape of the signal, such as a first rise of the pulse when it is first transmitted, or a first fall of the pulse when it is first transmitted. Furthermore, the moment of receiving a portion of the light beam by means of the array of the light sensors (or by means of the pixelated light switch array) may be obtained by means of a corresponding feature related to the shape of the signal, in an analogue way to the one used for obtaining the moment of transmission.

An alternative to said detection of the rise or fall of a pulse may be the use of a Constant Fraction Discriminator (CFD) circuit, which takes into account the whole duration of a pulse instead of the rise or fall. These type of circuits may be more efficient since they avoid the problems generated by the need of maintaining a constant and optimum level of threshold when detecting risings or falls, required when using other detecting techniques.

Alternatively, the light source may be adapted to generate a modulated light beam for modulated TOF calculation techniques. Therefore, a simple detection of a predetermined phase of the received portion of light beam is enough to detect the time of flight value of the corresponding portion of the light beam.

According to a further embodiment, the light source comprises a first element for adapting and widening the range of the light beam in order to reach a wider area. Said element may be an optical element such as an optical lens or a set of optical lenses, disposed in front of the light source's output in such a way that it widens the range of the output light beam transmitted towards a surface, thus enabling the light beam to reach a wider area and not a small area or a single point. This is useful since, if a digital image of a surface may be obtained, the reflected portions of a light beam may be reflected on several different points of said surface for the image to be correspondant to the surface.

Furthermore, the optical element may be important when using light sources which output narrow light beams, such as lasers, which otherwise would only reach a very small area of the surface to be imaged.

Also, the optical elements may be movable in such a way that they may be able to direct the light source output towards different zones, thus enabling to perform scanning of wider surfaces by moving the light source several times and making the light beam to reflect in different areas of a surface (e.g. the lenses may rotate horizontally, vertically, etc).

According to yet another embodiment, the scanning system further comprises a second element for generating an image of the surface on the pixelated light switch array. Further, the scanning system may comprise a third element for focusing each portion of the light beam received on the pixelated light switch array, on the array of light sensors.

For an optimum performance, the third lens has to be very accurate when focusing each portion of light beam on the pixelated light switch array, because of the small size of the pixels of the array, an also it may have to be able to focus properly for light coming from a wide range of distances.

In an analogue way as in the case of the optical element previously described, the second and third element may be an optical element (such as a lens or a set of lenses) which, in the case of the second one, directs the incoming portions of the light beam reflected on the surface, towards the pixelated light switch array, and in the case of the third one, it focuses each portion of light beam reflected by the pixelated light switch array towards the array of light sensors.

Furthermore, said second element may be embodied in a similar way as the zoom devices found in any analog or digital camera, thus enabling to focus and zooming in or out to determine which part of the surface is wished to obtain a digital image from. Also, this second element may have, as in the previous case, a movable part to direct the element towards a surface.

According to a preferred embodiment of the invention, the pixelated light switch array comprises a MEMS type device, which more specifically may be a Digital Micromirror Device (DMD). The DMD component is part of the technology known as DLP (Digital Light Projection) which has been developed by Texas Instruments since the late 1980s. A DMD comprises a set or array of micromirrors which may be deflected electrically by a programmed device (for example, the third computer system described before) connected to the DMD. Said DMD has been previously used in the field of projection of digital images, deflecting a source of light to project it on a screen.

By the use of a DMD, a much higher resolution is achieved when attempting to determine a plurality of TOFs from a surface, to obtain a 3D image of said reflecting surface. Furthermore, by using a DMD, the system may be more reliable in front of possible malfunctions and may have a higher durability, since the micromirrors comprised in it are electronically driven, and have a higher endurance than mechanical scanning devices.

Alternatively, the pixelated light switch array may comprise a liquid crystal display or deformable mirrors. In the case of a liquid crystal display, an option may be a screen such as an LCOS screen.

An LCOS™ or LCoS™ (Liquid crystal on silicon) screen comprises a "micro-projection" or "micro-display" reflective technology similar to DLP projectors technology. However, it uses liquid crystals instead of individual mirrors, the pixels being able to deflect, transmit or absorb incoming light in a given direction. Thus, such a device enables to selectively illuminate at least one pixel of the screen and direct the light arriving to the pixel, to a given direction, such control being performed electronically.

By way of comparison, LCD projectors use transmissive LCD chips, allowing light to pass through the liquid crystal. In LCoS, liquid crystals are applied directly to the surface of a silicon chip coated with an aluminized layer, with some type of passivation layer, which is highly reflective (being defined as reflective LCs type of liquid crystals). Depending on the specific LCoS chip, it may be preferable to use it instead of a device comprising micromirrors.

Other type of liquid crystal displays may be suitable to be used, such as the transmissive ones (for example, the Twisted nematic liquid crystals), or the ferroelectric ones (for example, the Ferroelectric liquid crystals (FLC), the Surface stabilized FLCs, and one of the most widely used nowadays, the FLCOS (Ferroelectric LC on silicon)) which are all suitable to be used in the invention.

On the other hand, a set of deformable mirrors based on MEMS technologies may be used. The Microelectromechanical systems or MEMS use a technology of very small mechanical devices driven by electricity, which are made up of components between 1 to 100 micrometers in size. The advantage of using MEMS devices derives in that the only driving to be done is an electrical one, and the scale of the MEMS devices enables to perform a determination of a time of flight with higher detail or spatial resolution, determining smaller portions of light beam reflected on to the surface, which may be useful for applications such as, for example, the obtaining of digital images of the reflecting surface.

According to another embodiment of the invention, a method for scanning a surface is provided, the method comprising:
transmitting a light beam to the surface to be scanned;
executing the method of receiving a light beam, for receiving the light beam reflected on the surface;
determining the time of flight value of each received portion of the light beam;
determining the distance-related parameter for each received portion of the light beam taking into account its determined time of flight value;
wherein the determined distance-related parameter of each portion of the light beam is indicative of a spatial point of the scanned surface.

The distance-related parameter may be a parameter which is used to obtain the real distance (such as speed), a parameter calculated out of distance or, for example, the value of the distance itself.

According to an embodiment of the invention, it is provided a computer program product comprising program instructions for causing a computer system to perform the method for scanning a surface described before.

According to another aspect, the invention provides a use of a pixelated light switch array, in which each switch is adapted for receiving at least one portion of a light beam and for deflecting it to an array of light sensors, in a system for scanning a surface or in a method for scanning a surface, described before.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS OF THE INVENTION

Figure 1:
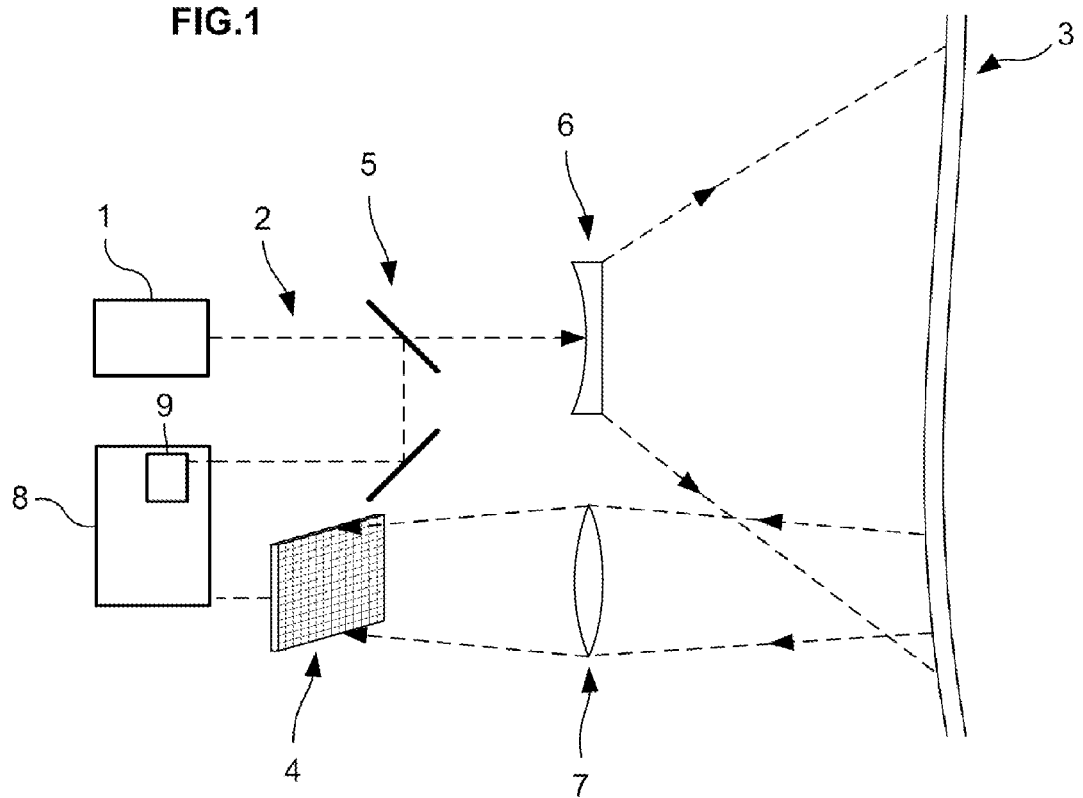
FIG. 1, is a schematic representation of a system for scanning a surface, according to the state of the art.
Figure 2:
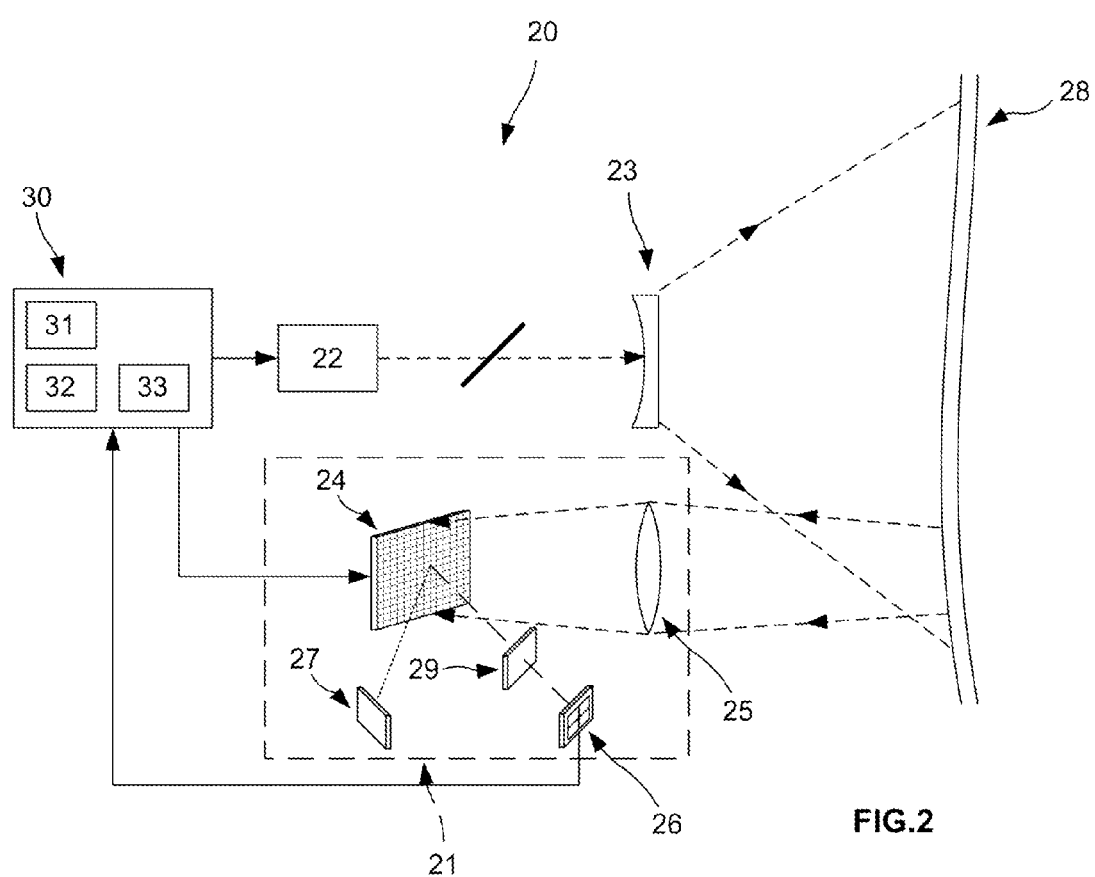
FIG. 2, is a schematic representation of a system for scanning a surface, according to the invention.

According to a preferred embodiment of the invention, a system 20 for scanning a surface 28 and obtaining a digital image of said surface will be described by means of the accompanying figures, wherein FIG. 2 depicts the system 20 for scanning a surface 28, which comprises a light source in the form of a pulsed laser beam transmitter 22 such as a Nd:YAG pulsed laser.

The laser transmitter 22 comprises a first set of lenses 23, which is displayed in such a way that, when the laser 22 transmits a laser pulsed light beam signal, the lenses widen the range of the laser beam, thus reaching a wide surface instead of a focalised point, as lasers usually do.

Furthermore, the system comprises a system for receiving a light beam 21 comprising a pixelated light switch array, which, in this case, is a DMD™ device 24 (Digital micromirror device), as the ones manufactured by Texas Instruments; an array of avalanche photodiode sensors in Geiger mode 26 for detecting light beams; and a second set of lenses 25 displayed before the DMD 24 surface. Said elements are displayed pursuing the generation of an image of the observed surface of the DMD.

Said first and second set of lenses 23 and 25 further comprises means to open and close its optical range, and therefore being able to direct more or less upcoming light beams into the device, towards the switches of the DMD 24, in such a way as a photographic or video camera's objective works. This way, an image is created on the DMD's surface, which is to be used to obtain an image of the observed surface of the DMD (which may be, for example, a topography image or a 3D image).

Said DMD comprises a plurality of 'pixels' defined by a plurality of electronically controlled micromirrors which are suitable for receiving the reflected portions of light beams on their surface and deflect a receiving light beam by rotating certain degrees; the relative position of the DMD and the array of photodiodes is such that, when a micromirror of the DMD is deflected, it conducts its corresponding portion of light beam towards one of the photodiodes of said array.

More precisely, the micromirrors have at least two deflecting positions, each having an angle such that the first one deflects the incoming light beam towards at least one of the avalanche photodiode sensors comprised in the array of photodiodes 26, and a second angle which deflects an incoming light beam towards a dump position, assuring that it is not directed to any of the photodiodes.

Furthermore, a third set of lenses 29 is arranged between the DMD 24 and the array of avalanche photodiode sensors 26, which is adjusted in such a way that, when any micromirror is deflected towards the array 26, the incoming light beam is directed correctly towards a photodiode of the array 26.

Also, the DMD device 24 comprises a number of micromirrors which is higher than the number of photodiodes of the array of photodiodes.

Furthermore, different DMD type devices exist in the market which may be suitable to be used with the present invention, each varying several features, which affect their spatial resolution, which may vary between 0.7 to 2 Megapixels. Therefore, an image obtained by using a DMD type device may have a resolution of up to 1920×1080 points, in front of a typical array of 176×144 points (that is, an image with 25344 pixels) normally found in the market.

Other features are fairly similar: for example, a large amount of DMD devices have a standard frame rate of 32.552 Hz and a micromirror inclination of up to +/−12°.

A further important feature is the "fill factor", which relates to the space between micromirrors, which, in this embodiment, is approximately 91%, corresponding to a space of 10.8 um or more between micromirrors.

Also, a dump element 27 is displayed in such a way that, when a switch of the DMD is not in use, it deflects its corresponding incoming portion of light beam towards said Dump, which avoids the interference with the portion of light beam which is being directed towards the light sensors by another switch of the DMD.

The system also comprises a computer controller 30 such as an FPGA device, which comprises several modules used to obtain the digital image of the surface where the light beam has been reflected.

The FPGA 30 performs the overall control of the system, coordinating all the different parts of it, such as the transmission of the laser, and the functioning of the reception part of the system, controlling the different elements such as the DMD and the array of photodiodes, and the signals sent and received from them, by means of different modules comprised in the FPGA itself.

A computer module of the FPGA is the Reception control module 31, which is connected to the DMD and the array of photodiodes, to electronically control their movements, obtaining signals from them, etc. For example, the deflection of the micromirrors and the obtaining of the detection signal from the array of photodiodes when the deflected light beam hits one photodiode, is performed by means of said Reception control module 31. It is important to highlight that the array of photodiodes may or may not be directly connected to the FPGA. For example, a pulse detection analog electronics may be provided between the FPGA and the array of photodiodes to adapt the signals sent between them.

A second computer module is the TOF (Time of flight) calculator module 32, which determines the Time of Flight value of each portion of light beam that arrives to each micromirror of the DMD, by detecting it through one photodiode of the array of photodiodes 26 using a widely known technique involving calculating the instant time when the laser pulse signal beam is transmitted and the arrival of the corresponding portion of the light beam which has been reflected on the surface, detecting the rise of one or several pulses of the received laser pulsed signal.

A further computer module comprised in the FPGA is the Imaging module 33, which, based on the calculated TOF of each point of the DMD (that is, of each portion of light beam received in its corresponding micromirror), calculates the distance travelled by each portion of light beam and uses it to determine the Z axis of a digital image.

Said digital image of the reflected surface is obtained by gathering the information corresponding to an X and Y axis, determined by the surface size of the DMD and the amount of micromirrors it comprises, thus obtaining a bidimensional digital image of the surface, and adding the third component, on the Z axis, by using the different distances travelled by the different portions of light beam reflected by the surface, which have arrived to the system through the DMD and the array of photodiodes, obtaining, at the end, a three-dimensional digital image of the reflected surface with components X, Y and Z.

Figure 3:
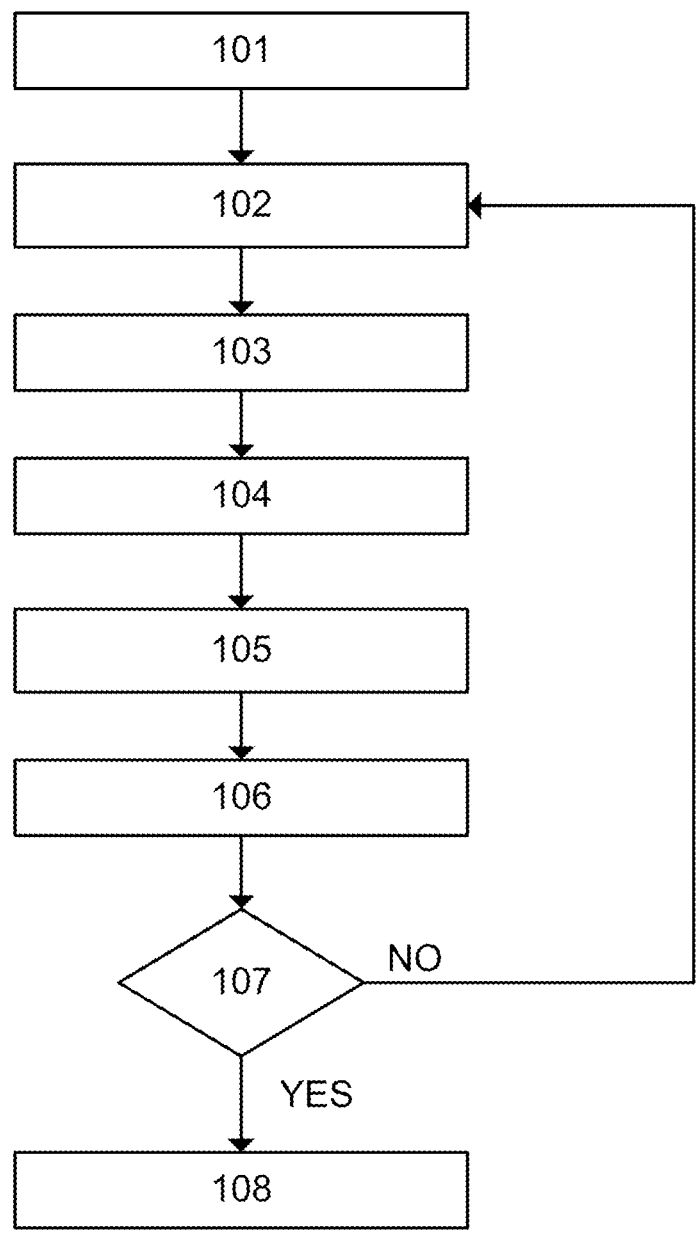
FIG. 3, is a flowchart of a method for scanning a surface, according to the invention.

According to the invention, as illustrated in FIG. 3, the previously described system is able to perform the method for scanning a surface, which comprises:

(101) Selecting a first micromirror of the DMD;
(102) Transmitting, by means of the laser transmitter 22, a pulsed laser signal to the surface to be scanned;
(103) Receiving portions of the light beam at the DMD device 24, through the second set of lenses 25, the portions of the light beam reflected by the surface to be scanned;
(104) Deflecting a portion of the light beam towards the array of photodiodes 26, by deflecting the selected micromirror of the DMD device 24;
(105) Calculating the Time of Flight value of the deflected portion of the light beam, the portion of the light beam being detected by a photodiode of the array of photodiodes 26;
(106) Determining, from the calculated time of flight, a Z value for a pixel of a scan pattern corresponding to the deflected micromirror;
(107) Verifying if all the micromirrors of the DMD have been deflected; in case of negative result, selecting a further micromirror of the DMD device 24 and returning to step (102);
(108) Obtaining a digital image from the X, Y and Z values comprised in the scan pattern.

In step (102), the Laser transmits a pulsed signal of hundreds or thousands of picoseconds and a peak power of some kW, which is adapted and its range widened by the set lenses 23 disposed in front of the Laser's output, to reach a further area of the surface to be scanned.

An example of such a Laser may be a compact laser source that generates radiation of the eyesafe wavelength region near 1.55 µm, such as the one described in "Eyesafe microchip laser for laser range finder application" by Do-Hyun Park et. al. Such a laser source may be useful in several applications involving the scanning of a person or an animal, since it can avoid any physical injury on the person's or animals eyes, typically done by a normal Laser.

Then, when the light beam is reflected on the surface and arrives to the receiver, in step (103), the second set of lenses 25 redirects the incoming portions of light beam towards the DMD 24 surface, which, as described in step (104), sequentially and individually deflects its micromirrors, redirecting the incoming portions of light beam towards the array of photodiodes 26, for each micromirror of the DMD.

In this example, only one photodiode is used to detect each deflected portion of light beams, but other alternatives may occur. For example, more than one photodiode can be used to detect the deflected portions of light beam. In such a case, the fact that there is a higher number of micromirrors than photodiodes enables the system, when sequentially redirecting the portions of light beam from the micromirrors to the photodiodes, to redirect the light beams to each photodiode, obtaining a higher spatial resolution (a higher number of micromirrors) using less photodiodes to detect all the incoming light beams.

A further alternative may be that more than one photodiode is used and they can detect portions of light beam in parallel. This enables to deflect a subset of micromirrors of the DMD device at once, thus using the photodiodes in parallel, each photodiode detecting a portion of light beam reflected by each deflected micromirror.

Therefore, to obtain the same spatial resolution without the DMD, that is, using a device with direct detection of the portions of light beam by means of the array of photodiodes, a higher number of photodiodes would have to be used, making the size of the device larger than the device of the present invention is (which comprises the DMD and less photodiodes).

Afterwards, each sensor detects the deflected light beam, producing a signal which is transmitted to the FPGA, where, based on the instant when the light beam was transmitted, and its arrival instant, determines the TOF value of each corresponding portion of light beam.

More precisely, according to the present embodiment of the invention, the FPGA has previously stored (at the time of the transmission) the instant when the pulsed laser signal has been transmitted, being said instant the time when the rise of the first pulse has been transmitted. Then, a time counter has been started at the instant of said rise, and when the arrival of the reflected light beam is detected, by means of the time counter, the time lapse between said transmission instant and the arrival instant of the corresponding pulse is determined.

Regarding the speed of the calculation of the TOFs, the high frame rate of the described DMD devices implies that the system has an approximate calculation velocity of 32 KHz, which enables to perform up to 32K measurements per second, with a spatial resolution of up to 2 Megapixels, as it has been previously described. However, if more than one light sensor is used in parallel to detect incoming light beams, more measures can be performed in less time (for example, if 4 sensors are used in parallel, it enables to perform 128K measurements per second).

Then, using common techniques of distance calculation based on Time of Flight calculations, a distance value $Z_i$ is determined for each calculated TOF value, corresponding to each portion of light beam reflected by each micromirror of the DMD.

When obtaining the digital image from one or more scan patterns, the image comprising X, Y and Z values, these values may be represented related or not to physical values (meters, feet, etc.).

The X and Y values may be represented in such a manner that, taking into account the first and/or second sets of lenses 23 and 25, a real value in meters/feet/other between pixels of the digital image may be determined, but in some cases, only the 'real' value of the Z axis may be needed, thus making unnecessary any calculation to determine the scale of the image corresponding to real lengths.

Furthermore, the real Z axis values of the images may be determined by the normal calculation of the time of flight plus further calculations, but sometimes, depending on the application, only the differences between values may be needed, thus not determining the real values of distances between the system and each point of the image, but the relationship between each point of the digital image.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Reference signs related to drawings and placed in parentheses in a claim, are solely for attempting to increase the intelligibility of the claim, and shall not be construed as limiting the scope of the claim. Thus, the scope of the present invention should not be limited by particular embodiments, but should be determined only by a fair reading of the claims that follow.

For example, in the description of the preferred embodiment, a specific implementation of the invention has been described which uses a pulsed light signal transmission and reception, but an alternative implementation can also comprise a modulated light signal transmission and reception.

In that case, the transmission and reception, as it has been described in the summary of the invention, would be different, in order to detect a modulated signal (for example, by detecting the reception of a specific phase of the signal, instead of, for example, the detection of a rise or fall of the pulsed signal performed in the preferred embodiment previously described).

Aside from said transmission and detection, the device could function in the same way as the described embodiment comprising a modulated signal transmission and reception, since the time-of-flights, distances and X, Y and Z values necessary to obtain an image, can be obtained by using the corresponding calculations in both cases.

Further, although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source code, object code, a code intermediate source and object code such as in partially compiled form, or in any other form suitable for use in the implementation of the processes according to the invention. The carrier may be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal, which may be conveyed via electrical or optical cable or by radio or other means.

When the program is embodied in a signal that may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

The invention claimed is:

1. An imaging system for obtaining a time of flight image from a surface, comprising:
    a light source that transmits a light beam to a surface;
    a system that includes an array of at least one light sensor; and
    a pixelated light switch array, the pixelated light switch array comprising a Digital Micromirror Device (DMD) having a higher number of switches than a total number of light sensors comprised in the array of at least one light sensors, wherein each switch of the DMD is adapted to deflect incoming portions of a light beam from the surface and to sequentially redirect the incoming portions to the array of the at least one light sensor by a higher number of incoming portions than the number of light sensors; and
    a computer controller that is adapted to control the switches of the DMD in a manner that enables the imaging system to obtain the time of flight image from the surface, wherein the computer controller is adapted to control switches of the DMD and to govern the sequentially redirected, deflected incoming portions of the light beam, the computer controller including a reception control module that is connected to the DMD and to the array of the at least one light sensor, coordinating the control switches of the DMD to direct a subset of the incoming portions to the array of at least one light sensors to detect in parallel a rise or fall of the light beam to determine a time of flight for each DMD control switch location, a calculator module that calculates a time of flight value of each portion of the light beam received at the one or more light sensors; and an imaging module that calculates a parameter related to the distance travelled by each received portion of the light beam, taking into account the calculated time of flight value, said determined parameter related to the distance of each portion of each light beam being indicative of a spatial point of the illuminated surface.

2. The system according to claim 1, wherein the light source comprises a first set of lenses for widening the illuminated area of the light beam.

3. The system according to claim 2, further comprising a second set of lenses for generating an image of the surface illuminated by the light beam on the DMD.

4. The system according to claim 3, further comprising a third set of lenses for focusing each portion of the light beam received on the DMD, on the array of the at least one light sensor.

5. The system according to claim 1, wherein the light source is adapted to generate a pulsed light beam for implementing, by means of the calculator module pulsed TOF measuring techniques, or to generate a modulated light beam for implementing, by means of the calculator module modulated TOF calculation techniques including the detection of a predetermined phase in the received incoming portions of the light beam.

6. The system according to claim 5, wherein the light source comprises a first set of lenses for widening the illuminated area of the light beam.

7. The system according to claim 6, further comprising a second set of lenses for generating an image of the surface on the DMD.

8. The system according to claim 7, further comprising a third set of lenses for focusing each portion of the light beam received on the DMD, on the array of the at least one light sensor.

9. The system according to claim 2, wherein each switch of the DMD is adapted for receiving at least one portion of a light beam and for directing the at least one portion of the light beam to the array of the at least one light sensor.

10. A method for obtaining a time of flight (TOF) image from a surface, comprising:
   transmitting a light beam to a surface;
   for each switch of a pixelated light switch array comprising a Digital Micromirror Device (DMD):
      receiving incoming portions of the light beam deflected from the surface;
      redirecting the received incoming portions of the light beam to an array of at least one light sensor; and
      controlling switches of the DMD, by means of a computer controller, to direct a subset of the incoming portions of the light beam to the array of at least one light sensor to detect in parallel a rise or fall of the light beam to determine a time of flight for each DMD control switch location in a manner that enables obtaining the time of flight image from the surface, by sequentially redirecting incoming portions of the light beam, in a higher number than a number of light sensors, from the switches to the at least one light sensor to achieve a spatial resolution increase of the TOF image of the surface, which receive a higher number of the incoming portions of the light beam than the number of light sensors, the DMD comprising a higher number of switches than the number of light sensors comprised in the array of the at least one light sensor;
   calculating by said computer controller a time of flight value of each portion of the light received at the at least one light sensor; and
   calculating by said computer controller a distance-related parameter for each received portion of the light beam taking into account its determined time of flight value, wherein the determined distance-related parameter of each portion of the light beam is indicative of a spatial point of the illuminated surface.

11. The method of claim 10, wherein the at least one light sensor is a photodiode, and the method further comprises:
   selecting a first micromirror of the DMD;
   transmitting, by means of a laser transmitter, a pulsed laser signal to the surface to be scanned said pulsed laser signal being said light beam;
   receiving at the DMD, through a second set of lenses, the portions of the light beam reflected by the surface to be scanned;
   deflecting a portion of the light beam towards the at least one photodiode, by deflecting the selected first micromirror of the DMD;
   calculating the time of flight value of the deflected portion of the light beam, the portion of the light beam being detected by a photodiode of the at least one photodiode;
   calculating, from the calculated time of flight, a Z value for a pixel of a scan pattern corresponding to the deflected micromirror;
   verifying if all the micromirrors of the DMD have been deflected, and in case of negative result selecting a further micromirror of the DMD and returning to step of transmitting; and
   obtaining a digital image from the X, Y and Z values comprised in the scan pattern.

12. The method of claim 10, further comprising adapting each switch of the DMD for receiving at least one portion of a light beam and for deflecting the at least one portion of the light beam to the array of the at least one light sensor.

13. The method of claim 10, wherein said image is a topography image or a 3D image of said surface.

14. An imaging system for obtaining a time of flight (TOF) image from a surface, comprising:
   a light source arranged to transmit a light beam to a surface;
   a system including an array of at least one light sensor and a pixelated light switch array, the pixelated light switch array comprising a Digital Micromirror Device (DMD) having a higher number of switches than the number of light sensors comprised in the array of at least one light sensor, wherein each switch of the DMD being adapted to deflect incoming portions of a light beam from the surface and to sequentially redirect the incoming portions, in a higher number than the number of light sensors, to the array of the at least one light sensor, wherein said sequentially redirect being governed by a computer controller controlling the switches of the DMD to direct a subset of the incoming portions of the light beam to the array of at least one light sensor to detect a rise or fall of the light beam to determine a time of flight for each DMD control switch location; and
   the computer controller including:
   a reception control module, connected to the DMD and the array of the at least one light sensor, and controlling them;
   a calculator module that calculates a time of flight value of each portion of the light beam received at the at least one light sensor; and
   an imaging module that calculates a parameter related to the distance traveled by each received portion of the light beam taking into account the calculated time of flight value, said determined parameter related to the distance of each portion of the light beam being indicative of a spatial point of the illuminated surface; and
   wherein the light source is adapted to generate a pulsed light beam for implementing, by means of the calculator module, pulsed TOF measuring techniques, or to generate a modulated light beam for implementing, by means of the calculator module, modulated TOF calculation techniques including the detection of a predetermined phase in the received portions of the light beam.

15. A non-transitory computer-readable medium comprising computer-readable instructions recorded thereon for obtaining a time of flight (TOF) image from a surface by:
transmitting a light beam to a surface;
for each switch of a pixelated light switch array comprising a Digital Micromirror Device (DMD):
receiving incoming portions of the light beam deflected from the surface;
redirecting the received incoming portions of the light beam to an array of at least one light sensor
controlling switches of the DMD to direct a subset of the incoming portions of the light beam to the array of at least one light sensor to detect a rise or fall of the light beam to determine a time of flight for each DMD control switch location even in a situation in which the array has only one light sensor by sequentially redirecting the incoming portions of the light beam, in a higher number than the number of light sensors, from the switches to the at least one light sensor to achieve a spatial resolution increase of the TOF image of the surface, which receive a higher number of the incoming portions of the light beam than the number of light sensors, the DMD having a higher number of switches than the number of light sensors comprised in the array of the at least one light sensor;
controlling reception, at the DMD, of deflected incoming portions of the light beam from the surface and sequentially redirecting said incoming portions towards the at least one light sensor;
calculating a time of flight value of each portion of the light received at the at least one light sensor; and
calculating a distance-related parameter for each received portion of the light beam taking into account its determined time of flight value, wherein the determined distance-related parameter of each portion of the light beam is indicative of a spatial point of the illuminated surface.

16. The method of claim 10, wherein the at least one sensor is a photomultiplier tube sensor, and the method further comprises:
selecting a first micromirror of the DMD;
transmitting, by means of a laser transmitter, a pulsed laser signal to the surface, said pulsed laser signal being said light beam;
receiving at the DMD, through a second set of lenses, the portions of the light beam reflected by the surface;
deflecting a portion of the light beam towards the at least one photomultiplier tube sensor, by deflecting the selected first micromirror of the DMD;
calculating the time of flight value of the deflected portion of the light beam, the portion of the light beam being detected by at least said a photomultiplier tube sensor;
calculating, from the calculated time of flight, a Z value for a pixel of a scan pattern corresponding to the deflected micromirror;
verifying if all the micromirrors of the DMD have been deflected, and in case of negative result selecting a further micromirror of the DMD and returning to the transmitting step; and
obtaining a digital image from the X, Y and Z values comprised in the scan pattern.

17. The method of claim 11, wherein the at least one photodiode is selected from the group consisting of an avalanche photodiode, a single photon avalanche photodiode and a silicon photomultiplier sensor.

18. The method of claim 10, wherein the array of at least one light sensor comprises more than one light sensor, the method comprising using the light sensors of the array in parallel to detect the sequentially redirected incoming portions of light beam.

* * * * *